United States Patent
Mutti et al.

(10) Patent No.: US 7,707,977 B2
(45) Date of Patent: May 4, 2010

(54) VARIABLE VALVE PERFORMANCE DETECTION STRATEGY FOR INTERNAL COMBUSTION ENGINE

(75) Inventors: James H. Mutti, East Peoria, IL (US); Kevin L. Dea, Washington, IL (US); John A. Gadbois, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 427 days.

(21) Appl. No.: 11/583,511

(22) Filed: Oct. 18, 2006

(65) Prior Publication Data

US 2008/0092836 A1  Apr. 24, 2008

(51) Int. Cl.
*F01L 1/34* (2006.01)
(52) U.S. Cl. .................. 123/90.15; 123/90.16
(58) Field of Classification Search ............. 123/90.15, 123/90.16, 90.17
See application file for complete search history.

(56) References Cited

U.S. PATENT DOCUMENTS

| | | | |
|---|---|---|---|
| 4,875,451 A | 10/1989 | Evasick et al. | |
| 5,107,701 A | 4/1992 | Smith | |
| 5,549,080 A * | 8/1996 | Uchikawa | 123/90.16 |
| 5,634,448 A | 6/1997 | Shinogle et al. | |
| 5,746,175 A | 5/1998 | Hu | |
| 5,839,420 A | 11/1998 | Thomas | |
| 6,092,495 A * | 7/2000 | Hackett | 123/90.15 |
| 6,216,668 B1 | 4/2001 | Haugen | |
| 6,354,266 B1 | 3/2002 | Cornell et al. | |
| 6,357,420 B1 | 3/2002 | Matta | |
| 6,363,314 B1 | 3/2002 | Hafner et al. | |
| 6,480,781 B1 | 11/2002 | Hafner et al. | |
| 6,655,349 B1 | 12/2003 | Cavanaugh | |
| 6,892,569 B2 | 5/2005 | Martin et al. | |
| 2001/0003973 A1* | 6/2001 | Nakamura et al. | 123/90.16 |
| 2002/0056581 A1* | 5/2002 | Mianzo et al. | 180/197 |
| 2003/0041843 A1 | 3/2003 | Shinogle | |
| 2005/0257604 A1 | 11/2005 | Zavarchi et al. | |
| 2007/0044761 A1 | 3/2007 | Hoshi et al. | |

FOREIGN PATENT DOCUMENTS

| | | |
|---|---|---|
| DE | 103 32 350 | 2/2004 |
| EP | 1 205 657 | 5/2002 |
| EP | 1 243 778 | 9/2002 |

OTHER PUBLICATIONS

PCT International Search Report; Applicant's File Ref.: 06-393; PCT/US2007/018029; Filing Date: Aug. 16, 2007; Applicant: Caterpillar Inc.

* cited by examiner

*Primary Examiner*—Zelalem Eshete
(74) *Attorney, Agent, or Firm*—Liell & McNeil

(57) ABSTRACT

A method for operating a multi-cylinder internal combustion engine includes varying the opening or closing of engine valves including intake or exhaust valves, in fluid communication with each of the cylinders of the engine. The method further includes generating a signal indicative of engine valve status in response to monitoring an acceleration parameter of the engine. An engine includes a computer configured to determine a performance status of intake or exhaust valves of the engine responsive to monitoring an engine acceleration parameter such as crankshaft acceleration. The computer is configured via fault detection and cylinder trimming routines to adjust valve performance based on a nominal crankshaft acceleration for the engine.

20 Claims, 4 Drawing Sheets

VARIABLE VALVE PERFORMANCE DETECTION STRATEGY FOR INTERNAL COMBUSTION ENGINE

TECHNICAL FIELD

The present disclosure relates generally to methods and systems for operating internal combustion engines having variable engine valves, and relates more particularly to a method of operating an intake or exhaust valve where its performance status is determined by monitoring engine crankshaft acceleration.

BACKGROUND

Variably timed intake and exhaust valves are used in a variety of engines, notably compression ignition internal combustion engines. Conventional engine systems utilize a rotating cam configured to control opening and/or closing of engine valves at desired times during an engine cycle. Variable valves provide some flexibility in opening or closing timing in such engine systems via actuators configured to control valve position separately from cam rotation. By varying the opening or closing timing of engine valves, operating strategies are enabled which can provide enhanced control over cylinder conditions during an engine cycle, enabling operating strategies to reduce emissions or facilitate engine braking, for example. As is well known in the art, however, these systems do not always consistently perform precisely as desired, and the performance characteristics of variable valves can vary under certain conditions.

One known application for variable valves relates to selectively holding open intake valves. In a typical engine cycle, a rotating cam opens an intake valve during an intake stroke in a particular cylinder, then permits the valve to return to a closed position approximately when the corresponding piston reaches a bottom dead center position and begins a compression phase. Variable intake valve actuation may be used to keep a particular intake valve in an open position past the point at which cam rotation would ordinarily allow the intake valve to close.

It is common for variable valves to be hydraulically actuated, via an intake valve actuator separate from the engine cam. In such a design, as an intake valve moves toward an open position under the influence of a rotating cam, hydraulic fluid is permitted to flow into a control cavity. A separate control valve may be then used to block fluid draining from the cavity, such that the intake valve actuator is hydraulically locked and inhibits closing of the intake valve. The intake valve may be held in an open position until such time as the control valve is adjusted to permit draining of fluid and consequent returning of the intake valve to a closed position. As alluded to above, however, certain performance characteristics such as the specific timing of variably actuated valve closing can depart from an optimal timing. Variations in timing can degrade overall engine performance, and emissions quality, and can render certain operating schemes unachievable.

One method of diagnosing problems in a variable valve engine relies upon the use of a pressure sensor coupled with a common rail that supplies actuation fluid to the intake valve actuator. Operation of variable valve actuators in an engine has been shown to be associated with certain changes in pressure in a common rail. Thus, an electronic controller may be coupled with the pressure sensor and configured to log changes in common rail pressure which correspond with expected changes from variable valve actuator operation. While such systems have performed relatively well over the years, they add expense and complexity to an engine system, and can suffer from reliability and warranty issues.

Another approach to monitoring certain aspects of engine performance and operation is known from United States Patent Application Publication No. 2005/0257604 to Zavarehi et. al. ("Zavarehi"). Zavarehi is directed to a method and system for determining engine cylinder power level deviations via an analysis of crankshaft speed fluctuations. To detect these power level deviations, the engine is operated at a steady state low idle condition, and engine speed data collected over a plurality of engine cycles. An averaged, filtered data set is compared to expected engine speed data. Substantial deviations from the expected speed data may indicate power level deviation in a particular cylinder. While Zavarehi provides an approach suitable for evaluating certain aspects of engine operation, other strategies concerned with variable valve performance are desirable.

The present disclosure is directed to one or more of the problems or shortcomings set forth above.

SUMMARY OF THE DISCLOSURE

In one aspect, the present disclosure provides a method for operating a multi-cylinder internal combustion engine. The method includes varying the opening or closing of engine valves, including intake or exhaust valves, in fluid communication with each of the cylinders of the engine. The method further includes monitoring an acceleration parameter of the engine, and generating a signal indicative of engine valve status in response to the monitored acceleration parameter.

In another aspect, the present disclosure provides a method of operating a variable engine valve, including one of an intake and an exhaust valve, in a multi-cylinder internal combustion engine. The method includes varying opening or closing of the variable valve, including commanding one of an opening timing and a closing timing via a control command to an actuator coupled with the variable valve. The method further includes monitoring an acceleration parameter of the engine, following the commanded opening timing or closing timing, and generating a signal indicative of valve status responsive to the monitored acceleration parameter.

In still another aspect, the present disclosure provides an internal combustion engine having at least two cylinders, intake valves in fluid communication with each of the at least two cylinders, and exhaust valves in fluid communication with each of the at least two cylinders. The engine further includes valve actuators configured to vary opening or closing timing of at least one of, the intake valves and the exhaust valves, and a computer configured to determine a performance status of at least one of, the intake valves and the exhaust valves, responsive to crankshaft acceleration of the engine.

DETAILED DESCRIPTION

Figure 1:
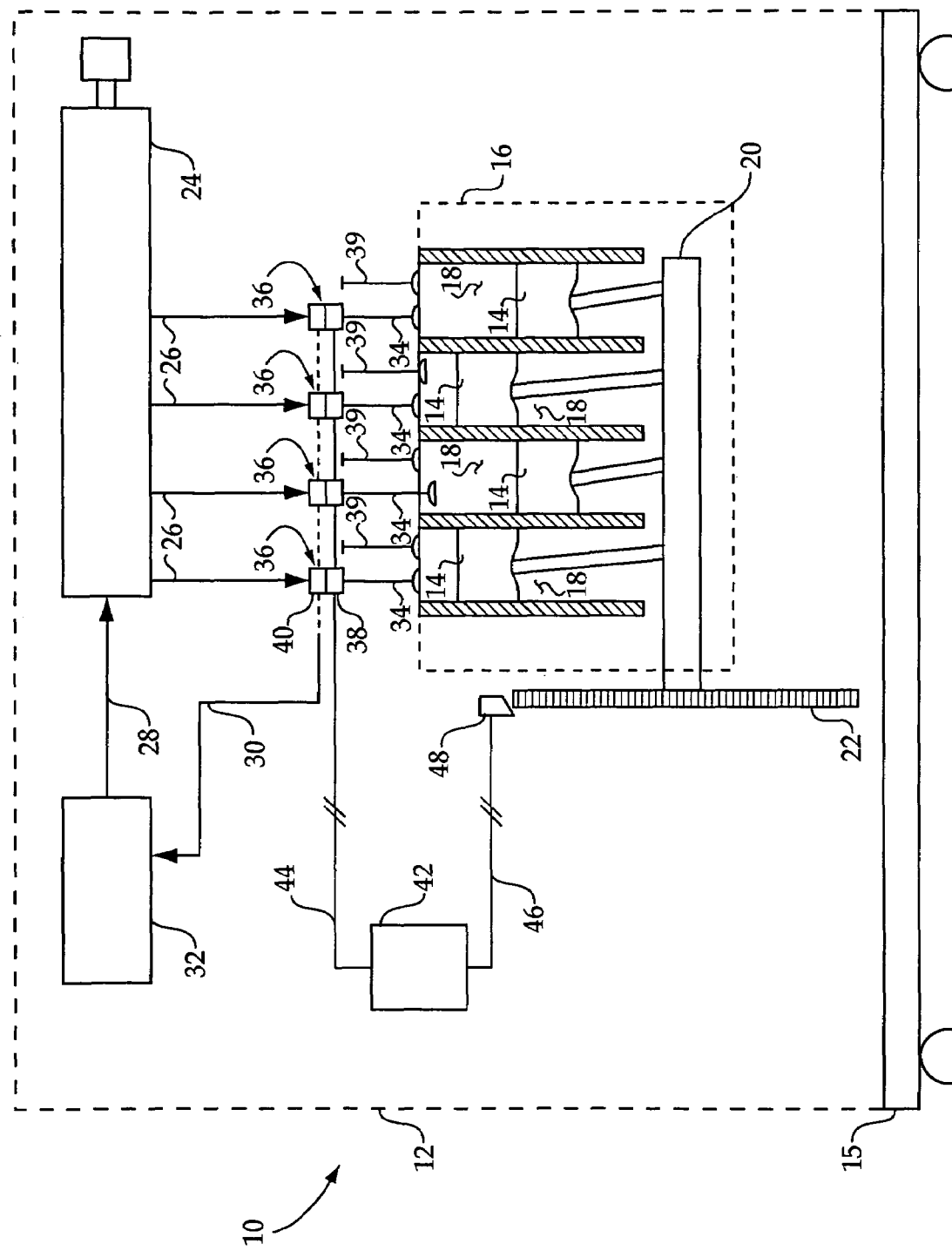
FIG. 1 is a schematic illustration of a machine having an engine system according to the present disclosure.

Referring to FIG. 1, there is shown a machine 10 having an engine system 12 according to the present disclosure. Engine system 12 may be mounted on a wheeled chassis 15, such as might be used in an on-highway truck or an off-road machine. It should be appreciated, however, that rather than a movable wheeled machine, machine 10 might be a stationary genset, pump, compressor or the like. Engine system 12 includes an engine housing 16 having a plurality of cylinders 18 therein, each including a movable piston 14 coupled with and configured to rotate a crankshaft 20. A plurality of engine valves 36 are positioned in fluid communication one with each of cylinders 18. Engine system 12 is shown in the context of a four cylinder in-line engine, however, a variety of other engine designs might be used without departing from the scope of the present disclosure. Engine system 12 is configured to determine a performance status of each of valves 36 and their associated cylinders 18, via monitoring of an engine acceleration parameter during operation, as further described herein. For reasons which will be apparent from the following description, the present disclosure is considered applicable to any engine system having some variable valve timing capability and means for monitoring an acceleration parameter that is associated with crankshaft acceleration.

Each of valves 36 may comprise a variable intake valve in fluid communication with one of cylinders 18, and includes a variable valve actuator 40 configured to control positioning of a valve member 34 to vary its closing timing during engine operation. It should be appreciated, however, that in other embodiments, opening timing or both opening and closing timing might be varied. Further, valves 36 might comprise exhaust valves, or valves 36 and another set of valves 39 might comprise variable intake and variable exhaust valves, respectively. In one practical implementation strategy, variable valve actuators 40 are hydraulically actuated, each being controlled via a control valve 38 such as an electrically actuated control valve connecting with an electronic controller 42 via a communication line(s) 44.

Hydraulic fluid used to actuate variable valve actuators 40, and hence control a position of each valve member 34, may be supplied via fluid passages 26 from a common rail 24. Common rail 24 may be supplied with hydraulic fluid from a fluid source 32 via another fluid passage 28, source 32 including a tank and pump for example. Actuation fluid draining from valves 36 may return to hydraulic fluid source 32 via a return line 30. It should be appreciated that rather than a common rail hydraulic system, engine system 12 might include a different strategy for powering/controlling actuators 40 than that described herein, and the present description should therefore not be construed in a limiting sense.

In one contemplated embodiment, a position of each of valve members 34 may be controlled in part by rotation of an engine cam, further described herein, and variable valve actuators 40 used to control a position of valve members 34 separately from rotation of the associated engine cam. It should be appreciated, however, that engine system 12 might comprise a camless engine wherein sole control over valve position is achieved via electronically controlled actuators, hydraulic or otherwise, coupled with each of valves 36.

Figure 2:
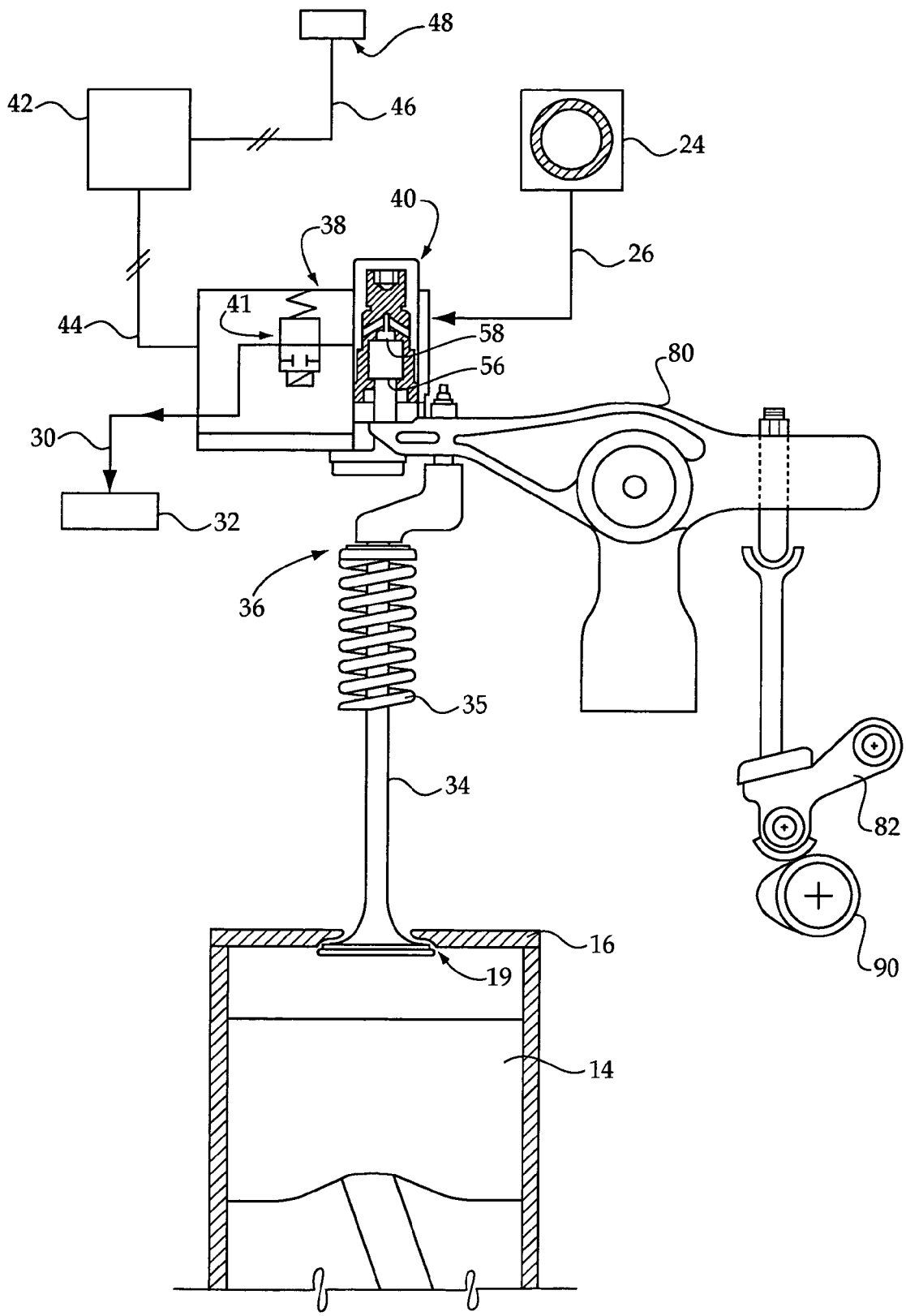
FIG. 2 is a diagrammatic illustration of a portion of an engine system according to the present disclosure.

Turning to FIG. 2, there is shown one of valves 36 and related components, in more detail. As illustrated, valve member 34 may be movable relative to engine housing 16 to open or close fluid communications with a cylinder 18 of engine system 12. An engine cam 90 is provided, along with a cam follower 82 and a rocker arm 80. In one embodiment, rotation of cam 90 will induce rocker arm 80 to tilt back and forth such that valve member 34 is alternately moved toward and away from a seat 19 on engine housing 16, opening and closing, in cooperation with a return spring 35. Variable valve actuator 40 may be used to selectively inhibit returning of valve member 34 to a closed position against seat 19. In particular, as rocker arm 80 tilts counterclockwise in FIG. 2, urging valve member 34 away from seat 19, hydraulic fluid from common rail 25 may travel via passage 26 into a chamber 58, previously occupied by a movable actuator member or piston 56. In other words, rocker arm 80 will move actuator member 56 as it tilts in a counterclockwise direction such that fluid can flow into chamber 58. Where it is desired to maintain valve member 34 in a position different from the position dictated by cam 90, actuator 38 may be used to block fluid draining from chamber 58 such that movable member 56 is hydraulically locked. In particular, control valve 38, which may be normally open, may be coupled with an electrical actuator 41 configured to block fluid outlet passage 30 when activated. When actuator 41 is deactivated, fluid passage 30 will no longer be blocked, and movable member 56 may return towards a position at which it will no longer inhibit movement of rocker arm 80. Valve member 34 will then tend to move toward a closed position under the influence of return spring 35.

As alluded to above, engine system 12 may include components configured to determine performance status of each of valves 36 and their associated cylinders 18 via monitoring of an engine acceleration parameter. Returning to FIG. 1, engine system 12 may further include a sensor 48 coupled with a flywheel 22. Flywheel 22 is in turn coupled with crankshaft 20, such that an acceleration of crankshaft 20 may be monitored via measuring tooth periods of flywheel 22 with sensor 48. It should be appreciated that a variety of other means for determining or estimating crankshaft acceleration might be used within the context of the present disclosure. For instance, transmission input shaft acceleration, camshaft acceleration, or some other parameter might be monitored. The present disclosure contemplates monitoring an engine acceleration parameter indicative of crankshaft acceleration, directly or indirectly, via any suitable means.

Monitoring an engine acceleration parameter as described above may comprise part of an engine operating strategy, and in particular a valve operating method, that will allow performance status of each of the variable valves 36 and associated cylinders 18 in engine system 12 to be determined. In particular, the method may include varying the opening or closing of engine valves, including intake or exhaust valves as described herein, monitoring an acceleration parameter of engine system 12, and generating a signal indicative of engine valve status in response to the monitored acceleration parameter. The generated signal might comprise a signal which is acted upon to trim one or more of valves 36 and their associated cylinders 18. The signal might alternatively consist of an alert to an operator or technician, for example via a service tool, which indicates that a problem exists with respect to the operation of one or more of valves 36. In one embodiment, the generated signal might illuminate a check-engine light.

It has been discovered that a difference, or lack of difference, in crankshaft acceleration relative to expected acceleration following commanding a valve closing timing for a given cylinder 18 can indicate whether a valve 36 and associated variable valve actuator 40 are functioning as desired. In one example of variable intake valve operation, during an engine cycle, cam 90 will rotate to move each valve member 34 to an open position during each piston intake stroke, then permit spring 35 to urge the valve member 34 toward a closed position. Approximately as the respective piston 14 reaches a bottom dead center position, actuator 40 may be used to selectively hold open valve member 34, allowing the corresponding piston 14 to begin a compression stroke with valve member 34 maintained slightly off its seat 16. "Valve open" control commands may be generated via electronic controller 42 and outputted via communication line(s) 44 to each of control valves 38 to hold open intake valves 36 until a specific valve closing timing. In other embodiments, such as an engine braking application, valves might be held closed rather than open, and the resultant effects on crankshaft acceleration analyzed upon opening of the valves.

As a result of holding open valves 36 past an ordinarily cam-dictated closing timing, the pressure in cylinder 18 will tend to be somewhat less than what the pressure would be were valves 36 operated according to the cam-dictated closing timing, given the relatively lesser volume of gas being compressed when intake valves 36 are held open past the cam-dictated closing timing. Interaction between each piston 14 and crankshaft 20 during a piston compression stroke will tend to retard crankshaft rotation, as pistons 14 encounter increasing resistance as the gases in the associated cylinder 18 become relatively more highly compressed. Thus, where variable intake valve actuation is occurring as desired, crankshaft 20 should tend to experience a change in acceleration that differs from the change, if any, which might be expected were variable intake valve actuation not used. In one embodiment, the change in acceleration occurring with proper intake valve holding open, i.e. closing after a bottom dead center piston position, will result in crankshaft 20 actually decelerating less in response to a given piston compression stroke than it would were the intake valve closed at a bottom dead center piston position.

Although compression of gases in a given cylinder will tend to impart a retarding force on crankshaft 20, the net speeding up or slowing down of a crankshaft at any given time may depend upon the particular engine design, e.g. cylinder number or configuration, and operating strategy. It is nevertheless contemplated that a change in crankshaft acceleration will depend upon the closing timing of each valve 36, such that a comparison of monitored crankshaft acceleration with expected acceleration may be leveraged to determine the performance status of a particular valve 36, valve actuator 40 and cylinder 18. In general, it is contemplated that a relatively greater retarding force on crankshaft 20 may be associated with intake valves 36 which close at the cam-dictated closing timing, whereas a relatively lesser retarding force will be associated with intake valves 36 closing at the timing dictated by valve actuators 40. This difference in relative retarding force will tend to impart the change in acceleration that will correspond with proper variable valve operation. Where exhaust valves are variably timed, or a different intake valve variable timing strategy is used, changes in crankshaft acceleration indicative of valve status may differ as well. The present disclosure, however, is contemplated to be applicable to most, if not all, variable valve timing strategies, given the relationship between valve closing/opening timing and crankshaft acceleration. In the context of the embodiments specifically described herein, performance status of a specific valve may be determined by monitoring crankshaft acceleration following commanding a desired intake valve closing timing, in particular during the remainder of a compression stroke after the valve is commanded to close, and a portion of the following expansion stroke.

Figure 4:
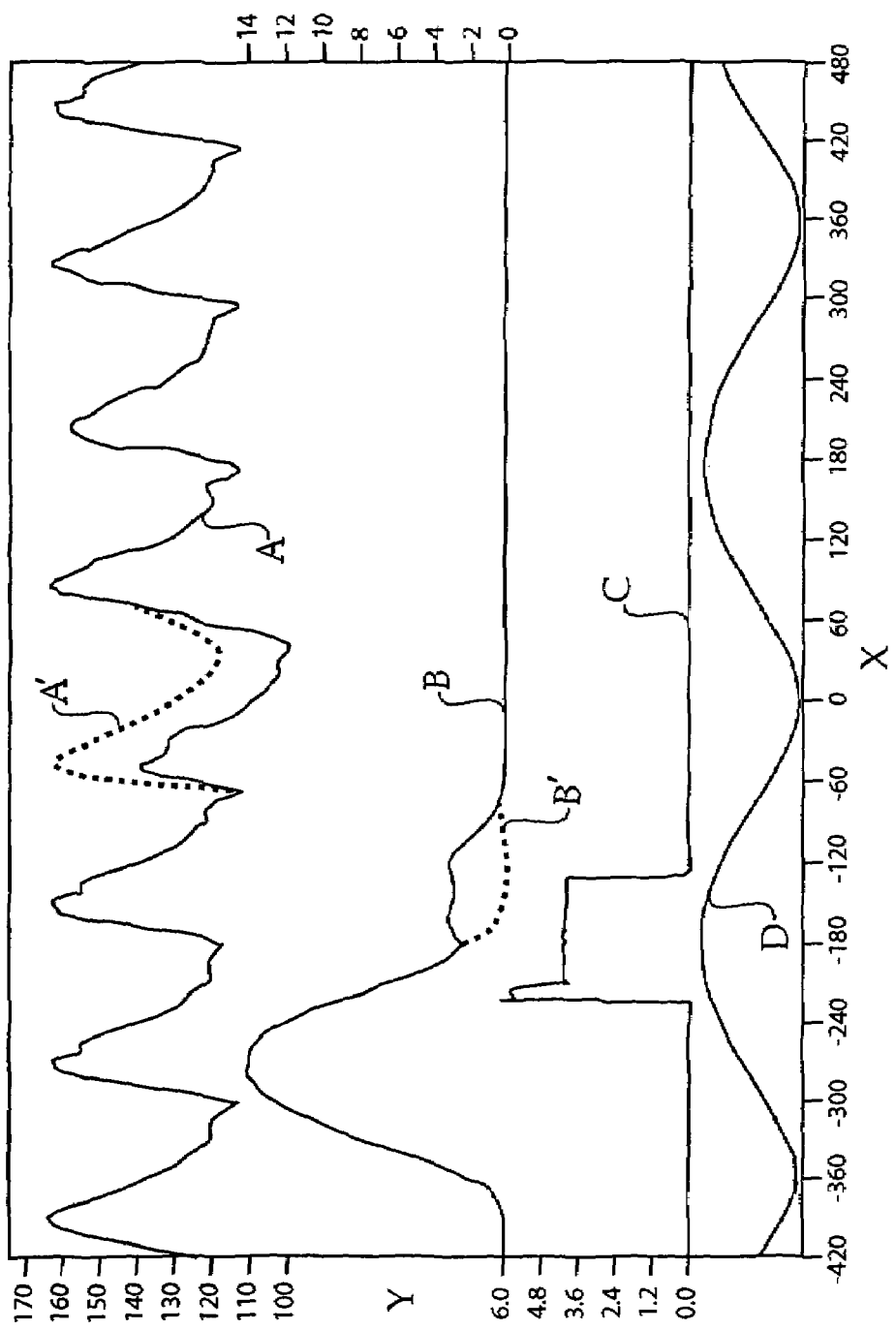
FIG. 4 is a graph illustrating various engine operating parameter values during a diagnostic/control process according to the present disclosure.

Turning also to FIG. 4, there is shown a graph illustrating certain of the above concepts, wherein the X-axis represents crank angle and the Y-axis represents signal values for each of a plurality of signal traces. In particular, the graph of FIG. 4 illustrates a flywheel tooth period, line A, an intake valve lift position, line B, an intake valve hold open command, line C, and cylinder volume, line D. With reference to line A, a dashed portion A' is shown approximately about a zero crank angle. The dashed portion A' represents approximate expected tooth periods where intake valve holding open is either not commanded, or is not functioning as expected. The solid portion of line A corresponding approximately to the same crank angle range associated with dashed line A' is generally representative of tooth periods expected where intake valve closing timing is as expected. It will be noted that the tooth periods associated with the solid portion of line A versus the dashed line A' are different, indicating a difference in crankshaft acceleration for that time period, corresponding to differences in cylinder pressure associated with the timing of intake valve closing, as described herein. Intake valve lift, shown as line B in FIG. 4, may be expected to generally follow the line that includes dashed line B' where holding open of the corresponding intake valve is not commanded, or where holding open is commanded but does not happen as expected. The solid line B represents an approximate intake valve lift as might be expected when functioning properly.

In view of the expected distinctions between crankshaft acceleration when variable intake valve actuation is properly functioning versus not properly functioning, the present disclosure further includes a means for indicating problems in valve performance. To this end, when a difference between expected crankshaft acceleration and monitored crankshaft acceleration satisfies fault criteria, e.g. the difference exceeds some threshold, electronic controller 42, or a service tool, may indicate a fault condition associated with one of cylinders 18. Corrective action may then be taken by way of further diagnostics, repair, servicing, component replacement, etc. Control valves such as valves 38 tend to be a common source of irregularities in operation and failure of variable intake valve systems. Thus, a fault condition associated with one or more of cylinders 18 may be associated with hydraulic fluid leaks, sticking or other failure of components of control valves 38, but could also arise from failure of actuator 40, or still another related engine system component.

Where complete failure of variable intake valve performance is not an issue, yet some irregularity among performance status of intake valves 36 is detected, the present disclosure provides means for modifying valve performance toward a desired performance status. In particular, monitoring crankshaft acceleration as described herein will enable trimming of one or more of cylinders 18. In one practical implementation strategy, engine system 12 may be operated in a calibration mode where cylinder balancing can take place.

When the calibration mode is activated, electronic controller 42 will typically determine a nominal crankshaft acceleration value, for example, by operating engine system 12 in a plurality of engine cycles, and recording crankshaft acceleration values associated with operation of each cylinder 18. Recording crankshaft acceleration will allow electronic controller 42, or an external service tool, to calculate an average or nominal crankshaft acceleration for engine system 12. Once a nominal crankshaft acceleration is known, crankshaft acceleration in time periods following commanded intake valve closing timing can be compared with the nominal crankshaft acceleration, and the time at which intake valve closing timing for individual cylinders is commanded, may be adjusted. In this manner, electronic controller 42 may loop through each cylinder 18 until a crankshaft acceleration value associated with each is known, then proceed in trimming cylinders toward nominal to improve or restore operating efficiency and smoothness of engine system 12.

Electronic controller 42 may be configured via a diagnostic routine or algorithm to determine engine valve status, and responsively trim one of cylinders 18 toward nominal in the manner described herein. Electronic controller 42 may further include RAM, ROM, or another suitable computer readable medium whereupon the subject control algorithm is recorded. It should further be appreciated, however, that rather than an onboard electronic controller configured to perform the diagnostics described herein and/or trim cylinders 18 toward nominal, an external service tool might be connected with an electrical system of engine system 12 to perform similar procedures.

INDUSTRIAL APPLICABILITY

Figure 3:
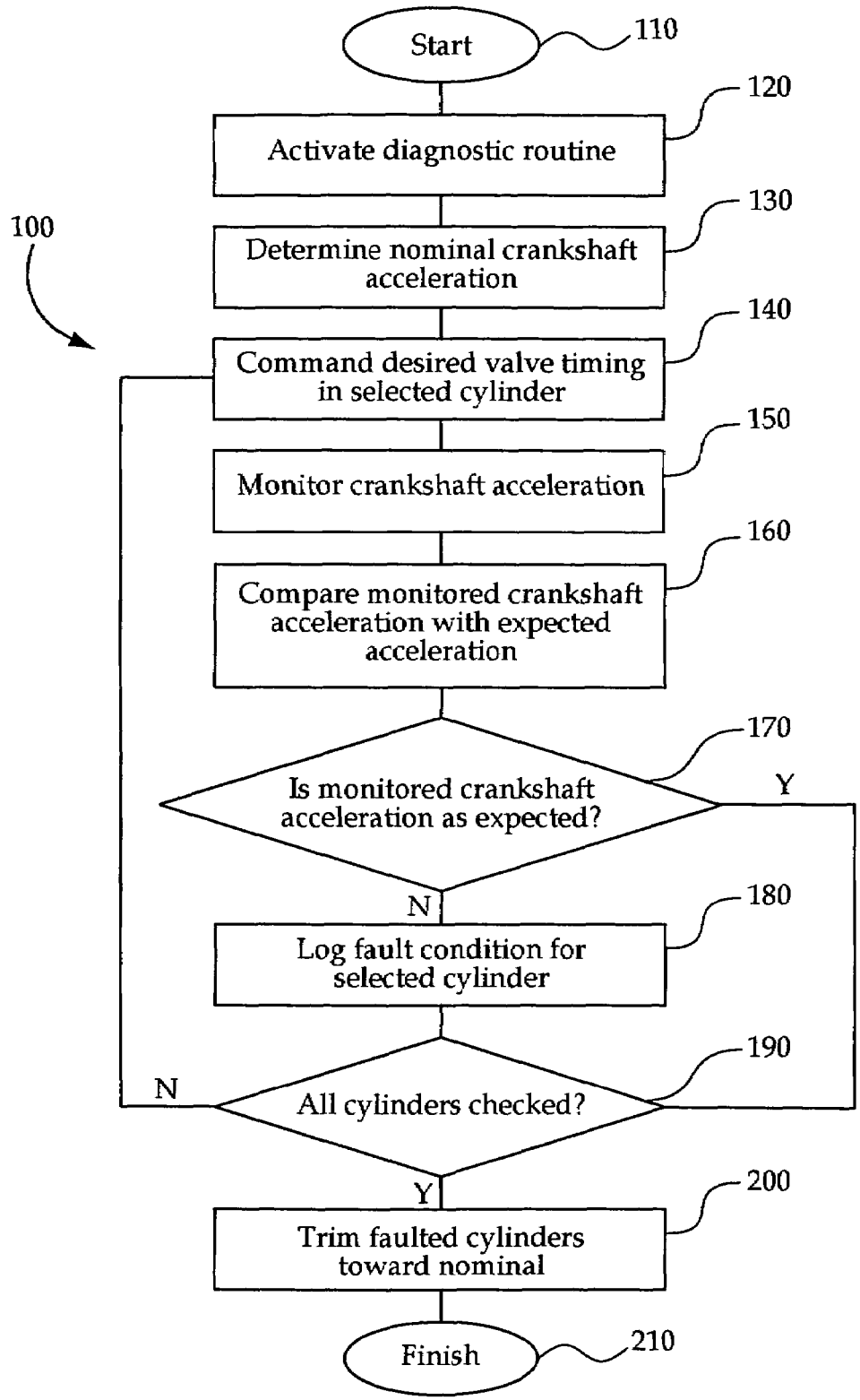
FIG. 3 is a flowchart illustrating a control process according to the present disclosure.

Turning to FIG. 3, there is shown a control process 100 according to one embodiment of the present disclosure. Process 100 may begin at a Start or initialize step 110. From step 110, process 100 may proceed to step 120 to activate a diagnostic routine, similar to that described herein. From step 120, process 100 may proceed to step 130 to determine nominal crankshaft acceleration for engine system 12, as described herein. From step 130, process 100 may proceed to step 140 wherein electronic controller 42 may command a desired valve timing such as a specific intake valve closing timing in a selected one of cylinders 14.

From step 140, process 100 may proceed to step 150 wherein electronic controller 42 may monitor crankshaft acceleration via inputs from sensor 48. From step 150, process 100 may proceed to step 150 wherein electronic controller 42 may compare monitored crankshaft acceleration with expected acceleration. From step 160, process 100 may proceed to step 170 wherein electronic controller 42 may query whether monitored crankshaft acceleration is as expected. If yes, process 100 may proceed ahead to step 190. If no, process 100 may proceed to step 180 wherein electronic controller 42 may log a fault condition for the selected cylinder being evaluated. It should be appreciated that fault criteria might be satisfied in a number of ways, for example where operation during a single engine cycle indicates a problem with a given cylinder, or alternatively only after a plurality of engine cycles have been sampled, and a problem is detected a plurality of times.

It is contemplated that control process 100 may loop through each of cylinders 18 to determine a performance status of each. To this end, from step 180, process 100 may proceed to step 190 wherein electronic controller 42 may query whether all the cylinders have been checked. If no, process 100 may return to step 140 so that electronic controller 42 may loop through the routine again, evaluating a different one of cylinders 18. If yes, process 100 may proceed to step 200 wherein each of the cylinders for which a fault condition has been logged can be trimmed toward nominal, as described herein. It should be appreciated that in some instances, such as where a full cylinder failure occurs, trimming of individual cylinders may not be possible. The present strategy, however, will enable detection of both fully failed cylinders and merely malfunctioning, or sub-optimal, cylinders, in a manner superior to earlier approaches. Thus, trimming and diagnostics may be independent activities.

It is contemplated that the presently described diagnostic and trimming strategies will best be implemented where machine 10 is operated with engine system 12 in a no load, low idle, zero ground speed state. Under such conditions, external and internal dynamics are generally minimized, and sensing of relatively small changes in crankshaft acceleration will generally be more readily and reliably carried out. The present disclosure is not thereby limited, however, and in other embodiments, the present strategy might be implemented where machine 10 is operating under different conditions. It should further be appreciated that the diagnostic and trimming routines carried out by electronic controller 42, or an external service tool, need not take place back to back. In other words, diagnosing problems with intake valve timing might take place entirely separate from correcting problems via trimming. In still other embodiments, problems might be diagnosed on-board with electronic controller 42, but cylinder trimming/balancing take place at a service station via an external service tool.

The present disclosure provides a means for diagnosing variable valve and associated cylinder performance that improves over earlier strategies. Performance data may also be used in trimming individual cylinders towards a more nominal operation in a manner not possible with certain known approaches such as rail pressure monitoring. Optimal performance can thus be achieved without time-consuming and expensive downtime. In addition, indications that particular components are beginning to degrade in terms of unpredictable or incorrect intake valve closing timing may be used in addressing problems before they become acute and risk damage to an engine system due to excessive in-cylinder pressures. Further still, the cost and complexity of equipping an engine system with extra sensors such as rail pressure sensors may be avoided, in that the monitoring necessary to identify and correct valve performance problems can be carried out with a conventional speed timing sensor, already standard on many internal combustion engines.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For instance, while the foregoing description emphasizes monitoring acceleration directly, the present disclosure is not thereby limited. The effects of valve closing timing may be evident in a manner analogous to that described herein where crankshaft speed is monitored, rather than acceleration. In other words, where an intake valve closes at a certain timing, whether a desired or an undesired timing, monitoring crankshaft speed or a parameter relating thereto, may indicate variations and failures in valve performance in a manner similar to the use of acceleration data. Thus, the present description of acceleration parameters should not be understood to limit the present disclosure to actually sensing acceleration, as related parameters such as speed might instead be used to similar effect. Other aspects, features and advantages will be apparent upon an examination of the attached drawings and appended claims.

What is claimed is:

1. A method for operating a multi-cylinder internal combustion engine comprising the steps of:

moving engine valves of the engine between an open position and a closed position at least in part by rotating a cam;

activating a diagnostic routine;

varying the opening or closing of the engine valves while the diagnostic routine is activated, the engine valves including intake or exhaust valves, in fluid communication with each of the cylinders of the engine;

wherein the varying step includes outputting control commands to valve actuators of the engine;

monitoring an acceleration parameter of the engine after outputting the control commands;
comparing the monitored acceleration parameter of the engine with an expected acceleration of the engine; and
generating a signal indicative of engine valve performance status in response to the comparison of the monitored acceleration parameter of the engine with an expected acceleration of the engine, wherein the signal is further indicative of whether a difference between the monitored acceleration parameter and the expected acceleration satisfies fault criteria.

2. The method of claim 1 wherein the varying step comprises varying a closing timing of a plurality of intake valves of the engine.

3. The method of claim 2 wherein the monitoring step comprises monitoring crankshaft acceleration following a closing timing for each of the intake valves.

4. The method of claim 3 wherein the generating step comprises the generation of signals specific to each one of the plurality of intake valves of the engine.

5. The method of claim 4 wherein each of the plurality of intake valves is configured to move from a closed position to an open position in response to engine cam rotation, and wherein the varying step further comprises a step of commanding a closing timing for the intake valves which is later than a cam dictated closing timing via control commands to intake valve actuators.

6. The method of claim 5 further comprising a step of indicating a fault condition where at least one of the generated signals satisfies fault criteria.

7. The method of claim 6 wherein the step of indicating a fault condition comprises indicating a fault condition specific to one of the cylinders, where an expected change in crankshaft acceleration is absent following commanding a closing timing for one of the intake valves in fluid communication with the one of the cylinders.

8. The method of claim 2 further comprising a step of operating the engine in a calibration mode, including the steps of:
determining a nominal crankshaft acceleration for the engine;
commanding a closing timing for each of the intake valves;
recording crankshaft acceleration values associated with each one of the cylinders following commanding a closing timing for each one of the intake valves; and
trimming at least one cylinder of the engine based on the recorded crankshaft acceleration values.

9. A method of operating a variable engine valve, including one of an intake and an exhaust valve, in a multi-cylinder internal combustion engine comprising for operation a multi-cylinder internal combustion engine comprising the steps of:
moving the variable engine valve between an open position and a closed position at least in part by rotating a cam;
activating a diagnostic routine;
varying opening or closing of the variable valve while the diagnostic routine is activated, including commanding one of an opening timing and a closing timing via a control command to an actuator coupled with the variable valve;
monitoring an acceleration parameter of the engine, following the commanded opening timing or closing timing;
determining a nominal acceleration for the engine; and
generating a signal indicative of engine valve performance status responsive to the monitored acceleration parameter of the engine and the nominal acceleration for the engine, wherein the signal is further indicative of whether a difference between the monitored acceleration parameter and the nominal acceleration satisfies fault criteria.

10. The method of claim 9 wherein the varying step includes commanding a valve closing timing that differs from a cam dictated closing timing.

11. The method of claim 10 wherein the monitoring step comprises monitoring crankshaft acceleration via a step of sensing flywheel tooth periods, and wherein the generating step comprises generating a signal responsive to comparing monitored crankshaft acceleration with expected acceleration.

12. The method of claim 11 further comprising a step of indicating a fault condition, if a difference between monitored crankshaft acceleration and expected acceleration satisfies fault criteria.

13. The method of claim 12 wherein the variable valve comprises an intake valve, and wherein the varying step includes commanding a valve closing timing during a portion of a piston compression stroke in a cylinder in fluid communication with the intake valve.

14. The method of claim 13 further comprising a step of trimming a cylinder in fluid communication with the intake valve based on the nominal crankshaft acceleration, if a fault condition associated with the cylinder is indicated.

15. An internal combustion engine comprising:
at least two cylinders;
intake valves in fluid communication with each of the at least two cylinders;
exhaust valves in fluid communication with each of the at least two cylinders;
a cam coupled with at least one of, the intake valves and the exhaust valves;
valve actuators configured to vary opening or closing timing of at least one of, the intake valves and the exhaust valves; and
a computer configured to activate a diagnostic routine, vary opening or closing timing of at least one of, the intake valves and the exhaust valves while the diagnostic routine is activated, and determine a performance status which includes a fault status of at least one of, the intake valves and the exhaust valves, responsive to comparing an acceleration of the engine with an expected acceleration of the engine.

16. The internal combustion engine of claim 15 wherein said valve actuators are configured to vary a closing timing of the intake valves.

17. The internal combustion engine of claim 16 wherein the engine comprises an electrical system, and wherein the computer comprises a service tool configured to connect with the electrical system of the engine.

18. The internal combustion engine of claim 16 wherein the engine comprises an electrical system, and wherein the computer comprises an electronic control module of the engine, connected with the electrical system.

19. The internal combustion engine of claim 18 wherein the engine comprises a sensor configured to sense values indicative of crankshaft acceleration, and wherein said computer is configured via a fault detection routine to indicate a cylinder fault condition responsive to the comparison of the sensed crankshaft acceleration of the engine with the expected crankshaft acceleration of the engine for a time in an engine cycle following closing of each of the intake valves.

20. The internal combustion engine of claim 19 wherein said computer is configured via a cylinder trimming routine to determine a nominal crankshaft acceleration for the engine, and further configured to trim at least one of said cylinders based on the determined nominal crankshaft acceleration.

* * * * *